(12) United States Patent
Herringshaw et al.

(10) Patent No.: US 9,907,230 B2
(45) Date of Patent: Mar. 6, 2018

(54) REEL FOR A HARVESTING HEAD

(71) Applicant: Deere & Company, Moline, IL (US)

(72) Inventors: Brian Herringshaw, Bettendorf, IA (US); Joshua Pierson, Davenport, IA (US); Jesse R Neely, Annawan, IL (US); Terry L Demay, Annawan, IL (US); Krishna S Potluri, East Moline, IL (US)

(73) Assignee: Deere & Company, Moline, IL (US)

( * ) Notice: Subject to any disclaimer, the term of this patent is extended or adjusted under 35 U.S.C. 154(b) by 516 days.

(21) Appl. No.: 13/886,256

(22) Filed: May 2, 2013

(65) Prior Publication Data
US 2014/0325952 A1 Nov. 6, 2014

(51) Int. Cl.
*A01D 57/02* (2006.01)
*A01D 41/14* (2006.01)

(52) U.S. Cl.
CPC ............. *A01D 41/14* (2013.01); *A01D 57/02* (2013.01)

(58) Field of Classification Search
CPC .................... A01D 57/02–57/04; A01D 41/14
USPC .................................. 56/220, 221, 226, 227
See application file for complete search history.

(56) References Cited

U.S. PATENT DOCUMENTS

| | | | | |
|---|---|---|---|---|
| 1,118,398 A * | 11/1914 | DeImage | ............... | A01D 57/04 56/226 |
| 1,715,306 A * | 5/1929 | Peterson | ............... | A01D 57/04 56/220 |
| 2,024,735 A * | 12/1935 | Hume | ............... | A01D 57/04 56/220 |
| 2,102,709 A * | 12/1937 | Hume | ............... | A01D 57/02 56/220 |
| 2,644,289 A * | 7/1953 | Hume | ............... | A01D 57/04 56/226 |
| 3,667,198 A * | 6/1972 | Gibson | ............... | A01D 57/02 56/227 |
| 3,771,299 A * | 11/1973 | Gradwohl | ............... | A01D 57/03 56/220 |
| 3,796,030 A * | 3/1974 | Neal | ............... | A01D 57/02 56/220 |
| 3,869,847 A * | 3/1975 | May | ............... | A01D 57/02 56/220 |
| 4,016,710 A * | 4/1977 | May | ............... | A01D 57/02 56/220 |
| 4,706,448 A * | 11/1987 | Gessel | ............... | A01D 57/02 56/400 |
| 5,681,117 A * | 10/1997 | Wellman | ............... | A01D 57/02 384/441 |
| 6,199,358 B1 * | 3/2001 | Majkrzak | ............... | A01D 57/02 56/220 |
| 7,124,565 B2 * | 10/2006 | Lanzinger | ............... | A01D 57/02 56/220 |
| 7,165,385 B2 * | 1/2007 | Lanzinger | ............... | A01D 57/02 56/220 |
| 8,176,716 B2 * | 5/2012 | Coers | ............... | A01D 57/02 56/364 |
| 8,388,229 B2 * | 3/2013 | Holler | ............... | A01D 57/02 384/460 |

(Continued)

*Primary Examiner* — Thomas B Will
*Assistant Examiner* — Joan D Misa
(74) *Attorney, Agent, or Firm* — Rathe Lindenbaum LLP

(57) ABSTRACT

A reel (108) for an agricultural harvesting head (104) has thrust bearings at the ends of its bat supports (128) that counteract sagging of the reel under the force of gravity.

6 Claims, 5 Drawing Sheets

(56) References Cited

U.S. PATENT DOCUMENTS

| | | | |
|---|---|---|---|
| 2010/0098361 A1* | 4/2010 | Holler | F16C 17/10 384/416 |
| 2012/0047867 A1* | 3/2012 | Coers | A01D 57/02 56/220 |
| 2014/0116019 A1* | 5/2014 | Pierson | A01D 57/03 56/226 |
| 2014/0283494 A1* | 9/2014 | Schrattenecker | A01D 57/02 56/249 |
| 2014/0325952 A1* | 11/2014 | Herringshaw | A01D 57/02 56/227 |

* cited by examiner

REEL FOR A HARVESTING HEAD

FIELD

This invention relates to agricultural harvesters. In particular it relates to agricultural harvesting heads for agricultural harvesters. More particularly, it relates to reels for agricultural harvesting heads.

BACKGROUND

Agricultural harvesters such as combine harvesters travel through agricultural fields harvesting crops. The harvesting machines typically have an agricultural harvesting head disposed at the front of the agricultural harvester that engages the standing crop plants.

The agricultural harvesting head functions by severing the stalks of the crop plants adjacent to their roots, and carrying the cut crop plants into the agricultural harvester for further processing.

There is a need to direct the crop plants onto the agricultural harvesting head as the roots are severed. This function is provided by a reel. The reel extends laterally with respect to the direction of travel of the agricultural harvester. The reel engages the top portions of the crop plants as their stalks are severed, and pushes the upper portions of the crop plants rearward such that the cut crop plants are received by conveying mechanism on the agricultural harvesting head. The conveying mechanism carries the cut crop plants to the agricultural harvester where the crop plants are processed further.

The reel of an agricultural harvesting head is generally in the form of central tube that extends laterally and is elongate. Several smaller tubes commonly called "bats" are distributed equiangularly around the circumference of the central tube. These bats are generally spaced equidistant from the central tube. Each bat supports several fingers that are spaced equidistantly apart with respect to each other. These fingers extend in the same direction on each bat.

The central tube is driven in rotation, and in turn causes the bats to rotate about the longitudinal axis of the central tube. As each bat ascends and engages the tops of the uncut crop plants, the fingers on the bat urge the crop plants rearward and onto the upper surface of the agricultural harvesting head.

In recent years, agricultural harvesting heads have been made longer and longer. This increased length has required that the central tubes be made stiffer so they do not sag in the middle. When the central tube sags in the middle, there is a risk that the fingers will be cut by the elongate reciprocating knife that severs the stalks of the crop plants adjacent to the roots.

This need for greater stiffness due to length has required that the central tube be made with a larger diameter, and often with a thicker wall as well. This, in turn, means that the agricultural harvesting head is not just heavier proportional to its length but heavier due to the increased wall thickness of the central tube and larger diameter of the central tube.

This additional weight, in turn, requires that the agricultural harvester be made heavier to support this weight, in particular the feederhouse upon which the agricultural harvesting head rests, and the hydraulic cylinders that raise and lower the feederhouse, and thus the agricultural harvesting head.

What is required, therefore, is a reel that is lighter in weight than the traditional reel arrangement. It is an object of this invention to provide such a reel.

SUMMARY OF THE INVENTION

In accordance with one aspect of the invention, a reel for an agricultural harvesting head comprises a central tube having a longitudinal rotational axis. A plurality of bat supports are fixed to and extend radially outward from the central tube. Each of the bat supports has an outer end to which a bat mount is fixed. A bat is supported for rotation within each of the bat supports. A thrust bearing is provided at each bat mount to communicate an axial load from the bat mount to the bat passing through the bat mount.

In accordance with another aspect of the invention, a reel for an agricultural harvesting head is provided, the reel comprising: a central tube that is elongate, that has a circumference, and that has a rotational axis; a plurality of bat supports mounted to the central tube and extending outward therefrom, wherein the bat supports are spaced longitudinally along the length of central tube; a plurality of bats that are elongate and extend parallel to the central tube, wherein the bats are spaced apart about the circumference and further wherein each of the bats is configured to support a plurality of spaced-apart fingers that are configured to engage the tops of crop plants and move them toward the agricultural harvesting head; a plurality of bat mounts fixed to outer ends of the bat supports, wherein each of the bat mounts defines an aperture in which as corresponding bat is supported; wherein the bat mounts and the bats are configured as thrust bearings to communicate an axial load in the bats to the ends of the bat supports to hold the bats in a predetermined position with respect to each other and wherein the bat supports (are sufficiently rigid to communicate the forces applied to their ends to the central tube and reduce sagging of the central tube.

Each bat mount of the plurality of bat mounts may have a first bearing surface disposed on a first side of the bat support and each bat of the plurality of bats may have a second bearing surface, and the first bearing surface and the second bearing surface may be facing surfaces and may be disposed to abut each other to form a first thrust bearing of the thrust bearings.

The first bearing surface and the second bearing surface may be generally planar and may be perpendicular to a rotational axis of the bat.

Each bat mount may have a third bearing surface disposed on a second side of the bat mount that is opposite to the first side of the bat mount and each bat may have a fourth bearing surface, and the third bearing surface and the fourth bearing surface may face each other and maybe disposed to abut each other to form a second thrust bearing of the thrust bearings.

The third bearing surface and the fourth bearing surface may be generally planar and may be perpendicular to the rotational axis of the bat.

The second bearing surface may be formed on an annular ring that is fixed to, surrounds, and extends radially outward from an outer surface of said each bat, and the fourth bearing surface may be formed on an annular ring that is fixed to, surrounds, and extends radially outward from the outer surface of said each bat.

The first bearing surface may comprise a first bearing surface portion that is formed on a first hinged portion of said each bat mount, and the first bearing surface may comprise a second bearing surface portion that is formed on a second hinged portion of said each bat mount, and the first hinged portion and the second hinged portion may be hingeably coupled together.

The first bearing surface portion and the second bearing surface portion may be coplanar and may together define an annular ring that surrounds an outer surface of each bat.

The third bearing surface may comprise a third bearing surface portion that is formed on the first hinged portion of said each bat mount, and the third bearing surface may comprise a fourth bearing surface portion that is formed on the second hinged portion of said each bat mount.

The first bearing surface and the second bearing surface of the first thrust bearing may be configured to withstand a single thrust load of 200 lbf without breaking.

The first bearing surface and the second bearing surface of the first thrust bearing are configured to withstand a single thrust load of 400 lbf without breaking.

The first bearing surface and the second bearing surface of the first thrust bearing may be configured to withstand a single thrust load of 800 lbf without breaking.

The first bearing surface and the second bearing surface of the first thrust bearing may be configured to withstand 360,000 cycles of a 0 lbf to 100 lbf to 0 lbf load without breaking.

The first bearing surface and the second bearing surface of the first thrust bearing may be configured to withstand 360,000 cycles of a 0 lbf to 200 lbf to 0 lbf load without breaking.

A central tube length to central tube outer diameter ratio may be at least 45 and the reel may have a length of at least 20 feet long.

A central tube length to central tube outer diameter ratio may be at least 50 and the reel may have a length of at least 25 feet long.

A central tube length to central tube outer diameter ratio may be at least 55 and the reel may have a length of at least 30 feet long.

DETAILED DESCRIPTION

Figure 1:
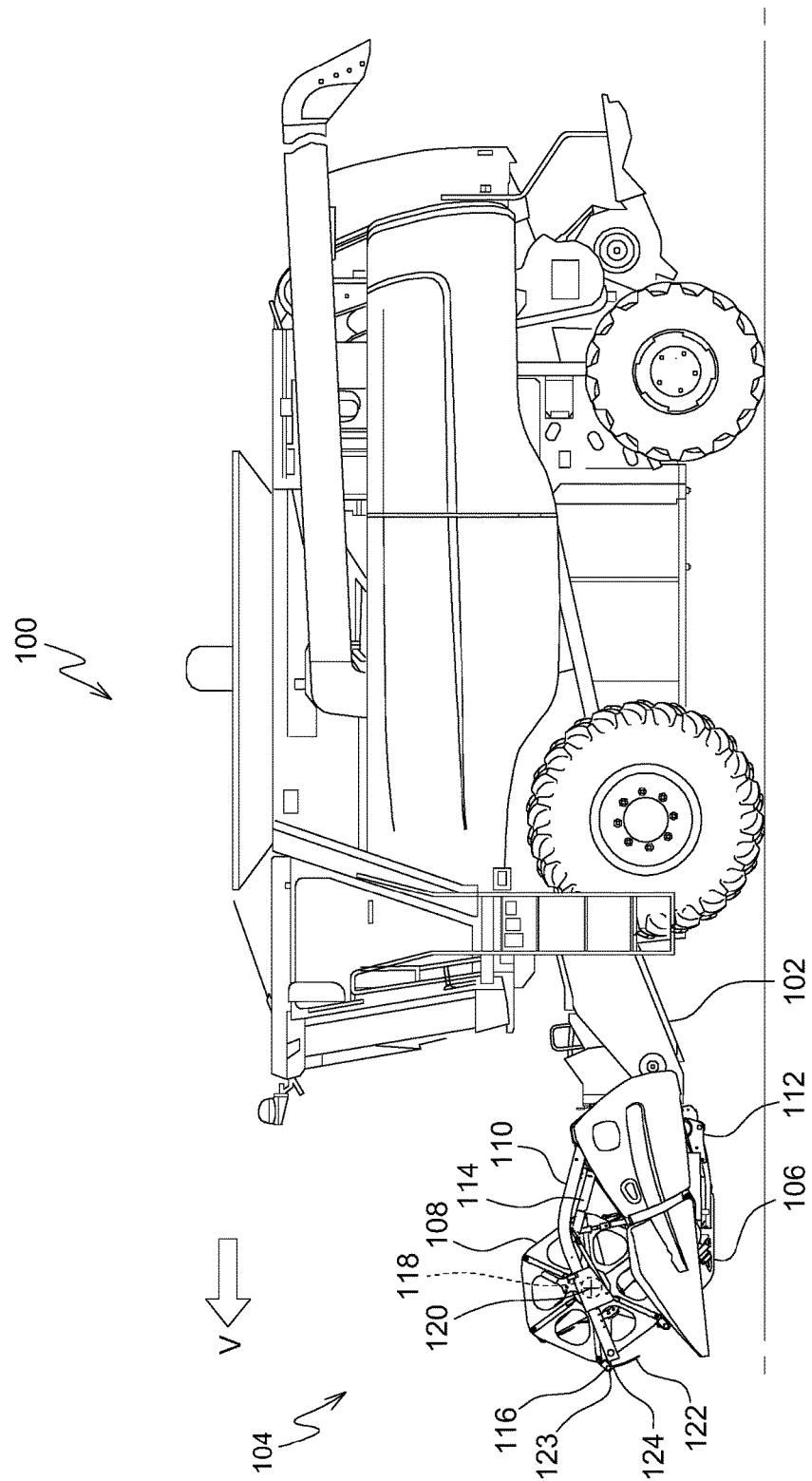
FIG. 1 illustrates an agricultural harvester with a reel in accordance with the present invention.

In FIG. 1, an agricultural harvester 100 has a feederhouse 102 extending forward therefrom in a direction of travel "V". An agricultural harvesting head 104 is supported on the front end of the feederhouse 102. The agricultural harvesting head 104 comprises a reciprocating knife 106 which extends substantially the entire width of the agricultural harvesting head 104. A reel 108 is supported on the agricultural harvesting head 104 above the reciprocating knife 106 and extends substantially the entire width of the agricultural harvesting head 104.

Opposite ends of the reel 108 are supported on arms 110 (only one is shown in FIG. 1). The arms 110 have rear ends that are pivotally coupled to the frame 112 and extend forward therefrom. The frame extends laterally and substantially the entire width of the agricultural harvesting head 104. Each arm 110 has a hydraulic cylinder 114 associated therewith that is disposed between and coupled to the arm 110 and the frame 112. The arms 110 (and therefore the reel 108) are raised and lowered by extending and retracting each hydraulic cylinder 114.

Bats 116 (six in this example) are supported on a central tube 118. The central tube 118 forms the primary structural element of the reel 108. The central tube 118 is formed of steel or an aluminum alloy. The central tube may be circular in cross-section. It may have flats defined up on its outer surface. These flats may extend in a direction parallel to a rotational axis 120. The central tube may have cutouts, slots, apertures, or other openings provided in the outer surface, for example, to reduce the weight of the central tube in areas in which the stress is not great. The central tube may be tapered over its length. The central tube may have struts or braces along its length to add additional strength.

Each bat 116 is elongate and extends laterally. Each bat 116 is equiangularly spaced about the circumference of the central tube 118. Each bat 116 is spaced generally equidistantly from a rotational axis 120 of the central tube 118. Bats 116 may be made of an aluminum alloy or steel. Bats 116 may be tubular. Bats 116 may be solid in cross section. Bats 116 may be circular in cross-section. Bats 116 may have flutes, ridges, or flats formed on their outer surfaces.

A plurality of fingers 122 are fixed to each bat 116. The plurality of fingers 122 on each bat 116 extend in the same general direction, such that as the bat approaches the crop plants, the fingers will simultaneously engage the tops of the crop plants.

The fingers are unitary injection molded plastic structures. Alternatively, they may be made of an aluminum alloy or steel. The fingers may comprise springs to permit them to flex under load. The fingers may be comprised of a combination of disparate materials, such as combination of plastic, of steel, and of aluminum alloys.

Each bat 116 is supported on the central tube 118 such that it can rotate about a longitudinal axis 124 as it simultaneously translates about the rotational axis 120.

In FIGS. 2-5, all of the fingers 122 have been removed for convenience of illustration. Each finger is fixed to a bat at a corresponding finger mount 123. Finger mounts 123 are distributed equidistantly along substantially the entire length of each bat 116. Finger mounts 123 are generally formed is an aperture or depression formed in the outer surface of each bat 116. The finger mounts 123 serve to orient their corresponding fingers 122 such that all the fingers 122 on each bat 116 extend outwardly from the bat 116 in the same direction.

Figure 2:
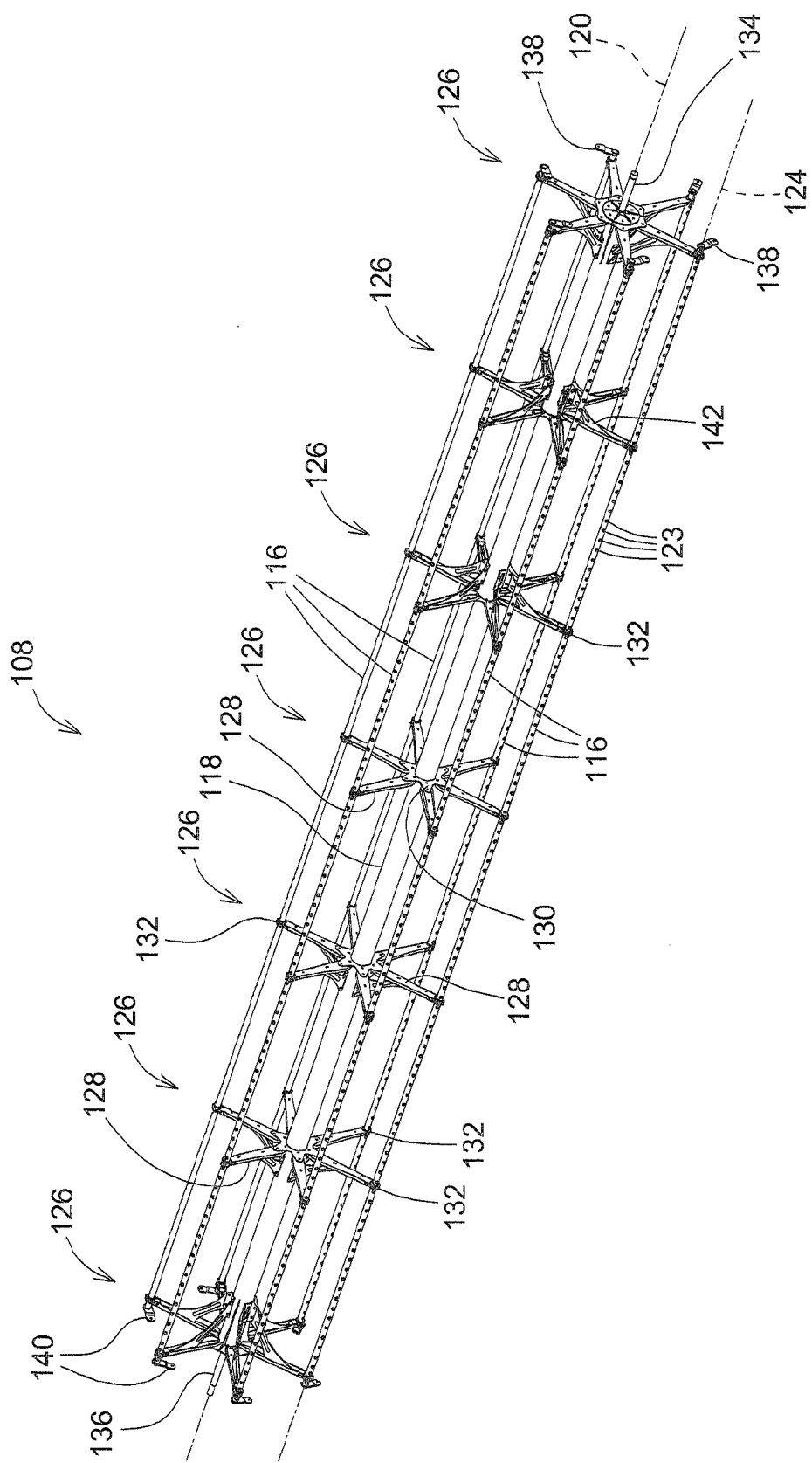
FIG. 2 illustrates the reel of the agricultural harvester of FIG. 1 in perspective view with all the other components, including the reel fingers, removed.

In FIG. 2, reel 108 comprises the central tube 118, seven sets 126 of bat supports 128, seven bat support mounts 130, six bats 116 associated with each bat support mount 130, and bat mounts 132 fixed to the end of each bat support 128.

The central tube has a left axle 134 and a right axle 136 that are fixed to the left end and the right end of the central tube 118 and extend outward therefrom. The reel 108 is supported on the left axle 134 and the right axle 136 for rotation about the rotational axis 120. When reference is made herein to the "length" or "overall length" of the reel 108, this length refers to the distance between the two arms that support opposing ends of the reel. In most cases, this will be substantially the same length as the overall length of the bats 116 and the overall length of the central tube 118.

Each bat support 128 is fixed at its inner end to the bat support mount 130 on the central tube 118 and extends outward therefrom. Each of the bat supports 128 in each set 126 of bat supports 128 is spaced equiangularly about the circumference of the central tube 118. In this example, since there are six bat supports 128 in each set 126 of bat supports 128, every bat support 128 is spaced 60° apart from its adjacent bat support.

Each set 126 of bat supports 128 is spaced equidistant from its adjacent set 126 of bat supports 128 along the length of the central tube 118.

A crank 138 is fixed to the left end of each bat 116. A crank 140 is fixed to the right end of each bat 116. The bats are rotated within bat mounts 132 through which they pass by pivoting the crank 138 and the crank 140 with respect to the bat mounts 132. This pivoting movement causes each of the bats 116 two simultaneously rotate with respect to all of the bat mounts 132 that support that bat 116 over its length. Since there are seven sets 126 of bat supports 128, each bat passes through and is supported for rotation by seven bat mounts 132.

Each bat support 128 has an associated strut 142 that is fixed to the bat support 128 and that is also fixed to the central tube 118. The strut 142 extends generally in an axial direction. This arrangement stiffens the bat support 128 to which the strut 142 is attached thereby reducing the ability of the bat support to be flexed back and forth in an axial direction (i.e. in a direction generally parallel to the rotational axis 120) at the outer end of the bat support 128. Not every bat support 128 has an associated strut 142. For example, in the embodiment illustrated in FIG. 2, the set of bat supports 128 located at the middle of the reel does not have any struts 142 associated therewith.

Figure 3:
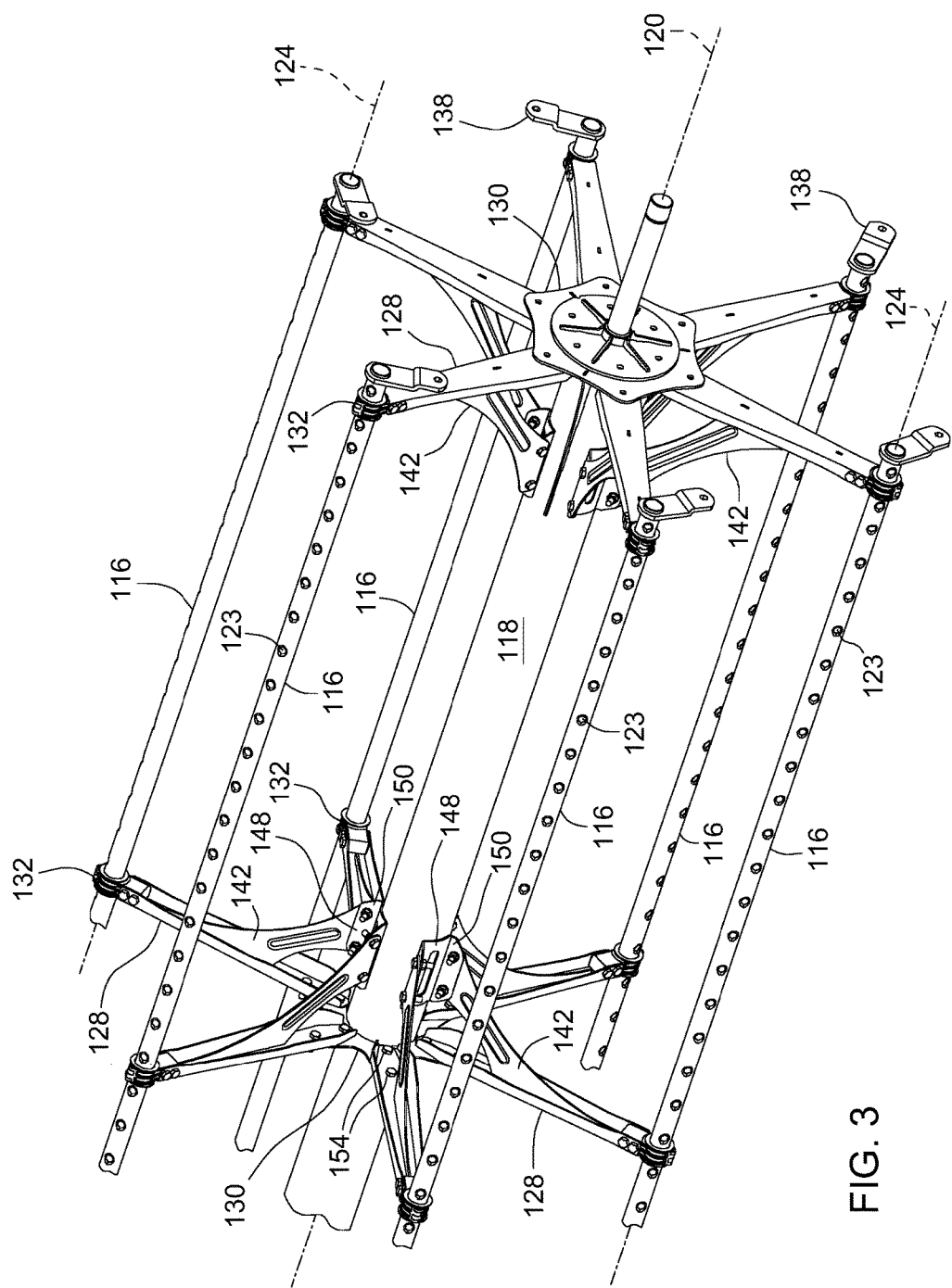
FIG. 3 is a fragmentary perspective detail view of the left end of the reel shown in FIG. 2.
Figure 4:
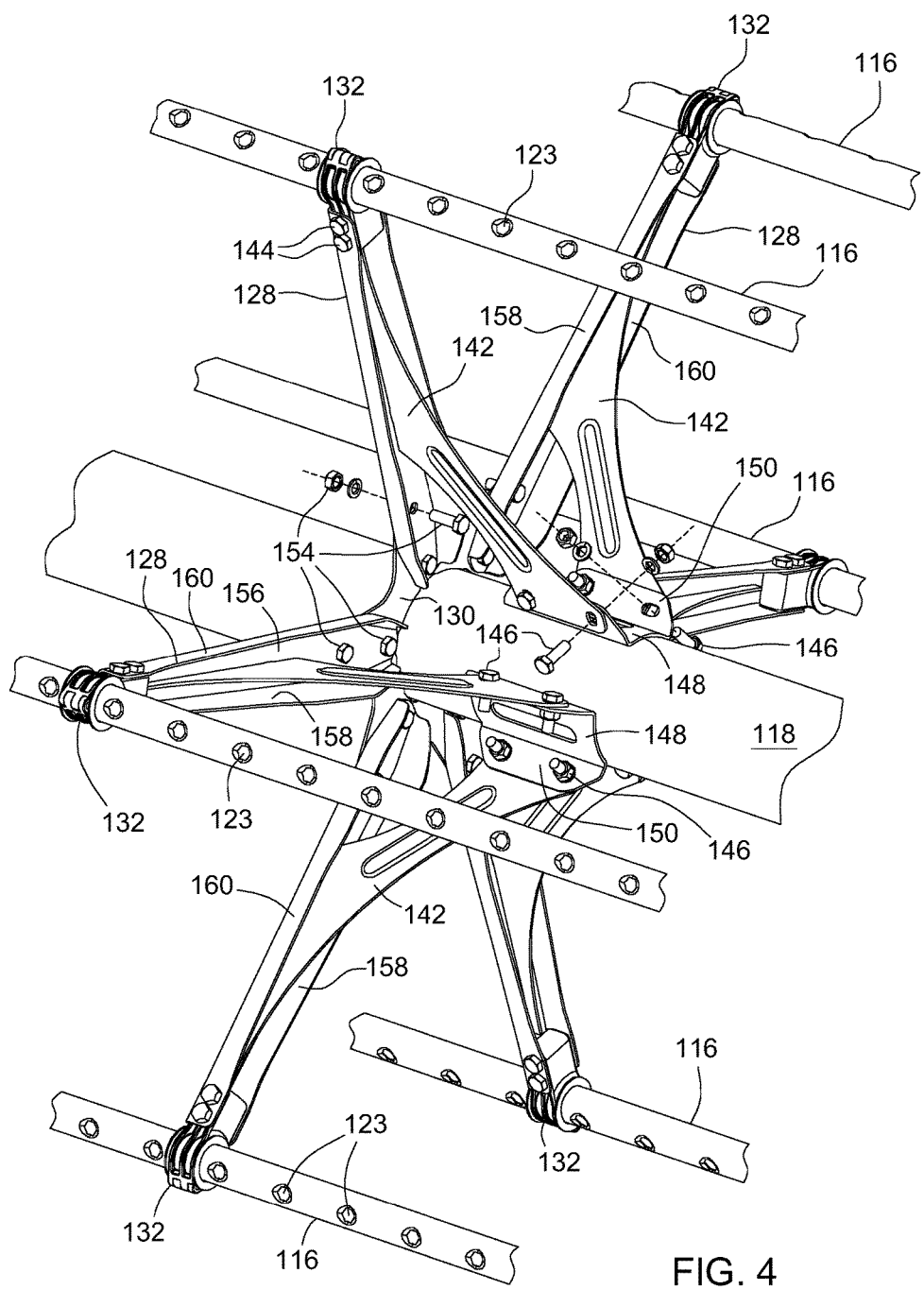
FIG. 4 is an enlarged fragmentary perspective detail view of a central portion of the reel shown in FIG. 3.

Referring to FIG. 3 and FIG. 4, each bat mount 132 is removably fixed to the outer end of its corresponding bat support 128 by removable fasteners 144. The removable fasteners 144 permit the bat mount 132 to be separated from both the bat 116 is supported within the bat mount 132 and from the outer end of the bat support 128. In one arrangement the removal fasteners 144 are threaded fasteners. In one arrangement the removable fasteners 144 comprise a nut and a bolt.

Each strut 142 is fixed to its corresponding bat support 128, preferably permanently, and by welding the strut 142 to the bat support 128. Each strut 142 is removably fixed to the central tube 118 with removable fasteners 146. In one arrangement the removable fasteners 146 are threaded fasteners. In one arrangement the removable fasteners 146 comprise a nut and a bolt.

The central tube 118 comprises a strut mount 148 associated with each strut 142. Each strut mount 148 is fixed to the central tube 118 and is configured to engage and be fixed to an associated strut 142. In one arrangement, each strut mount 148 is welded to the central tube 118 and includes a flange 150 that extends radially outward from the rotational axis 120 of the central tube 118.

Each set 126 of bat supports 128 are fixed to a bat support mount 130 which is in the form of an annular ring. The bat support mount 130 of each set 126 of bat supports 128 is fixed to the central tube 118. In one arrangement, the bat support mount 130 is welded to the central tube 118. The bat support mount 130 is generally planar, and lies in a plane generally perpendicular to the rotational axis 120. Bat supports 128 are removably fixed to the bat support mount 130 by removable fasteners 154. These removable fasteners 154 hold their associated bat supports 128 in their relative angular positions with respect to the central tube 118.

Each bat support 128 is generally U-shaped. Each bat support 128 has a web 156 that is generally planar and extends in a plane perpendicular to the rotational axis 120. Each bat support, as considered in a forward direction of rotation (counterclockwise as viewed in FIG. 1) has a leading flange 158 that is fixed to a leading edge of the web 156 and extends radially and generally perpendicular to the rotational axis 120. Each bat support 128 has a trailing flange 160 that is fixed to a trailing edge of the web 156 and extends radially and generally perpendicular to the rotational axis 120. The web 156 of each bat support 128 is fastened to the bat support mount 130. The strut 142 associated with each bat support 128 is fixed to the web 156 of that bat support 128 between the inner end of the bat support 128 where the bat support 128 is fixed to the bat support mount 130, and the outer end of the bat support 128 is fixed to the bat mount 132.

Figure 5:
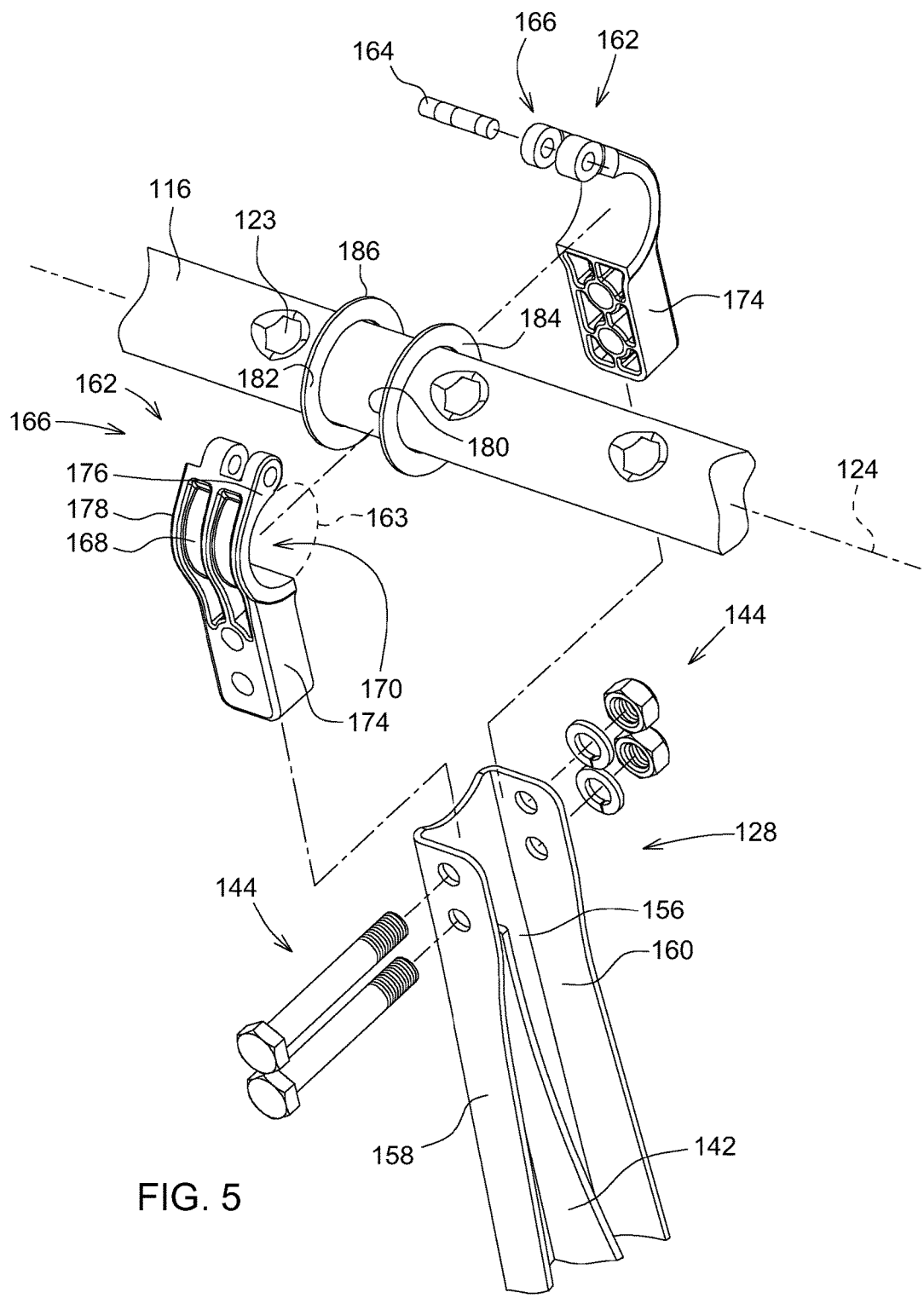
FIG. 5 is a partially exploded view of the outer end of a reel support, a reel mount, and a bat shown in FIG. 4.

Referring to FIG. 5, each bat mount 132 is comprised of two hinged portions 162 that are hingeably coupled together with a hinge pin 164. Each hinge portion 162 comprises a hinge coupling 166 located at an outer end of the hinge portion 162. Each hinge portion 162 comprises a strap portion 168 coupled to the hinge coupling 166. The strap portion 168 defines a semicircular recess 170 configured to receive and support a portion of the circular outer surface 172 of the bat 116. Each hinge portion 162 comprises a mounting portion 174 that is coupled to the strap portion 168 on the opposite side of the strap portion 168 from the hinge portion 162. When the two hinged portions 162 are closed the strap portions 168 define a circular aperture 163 extending completely around the circular outer surface of the bat 116.

In one arrangement, the bat mounts 132 are comprised of a polymer. The polymer may comprise a fiber reinforced plastic. The polymer may comprise polyethylene. The polymer may comprise nylon. In another arrangement, the bat mounts 132 are comprised of an aluminum alloy. In another arrangement, the bat mounts 132 are comprised of steel.

Each hinge portion 162 has a bearing surface 176 on a first side of the hinge portion 162 that is generally planar and perpendicular to the rotational axis 120. The bearing surface 176 faces in a direction generally parallel to the rotational axis 120 and toward one end of the central tube 118. The bearing surface 176 is also oriented generally parallel to the longitudinal axis 124 of the bat 116 upon which it is mounted.

Each hinge portion 162 has a bearing surface 178 located on a second side of the hinge portion 162 (that is opposite to the first side of the hinge portion 162). The bearing surface 178 faces in a direction generally parallel to the rotational axis 120 and toward the longitudinal center of the central tube 118. The bearing surface 178 is also oriented generally parallel to the longitudinal axis 124 of the bat 116 upon which it is mounted.

The bearing surface 176 is immediately adjacent to and engages a first corresponding bearing surface 180 that is provided on the bat 116. The bearing surface 178 is immediately adjacent to and engages a second bearing surface 182 that is provided on the bat 116. The first corresponding bearing surface 180 and the second corresponding bearing surface 182 are generally planar are and are oriented parallel to the rotational axis 120 and parallel to the longitudinal axis 124 of the bat on which they are provided.

In one arrangement, shown here, the first corresponding bearing surface 180 and the second corresponding bearing surface 182 are provided on the two inner facing surfaces of a first annular ring 184, and a second annular ring 186, respectively. A slight clearance (1-4 mm) is provided between the annular rings and the bat mount to permit the bat 116 to rotate with respect to the bat mount.

The bearing surface 176 and the first corresponding bearing surface 180 define a thrust bearing that prevents the bat mount 132 from translating along the bat 116 in one axial direction. The bearing surface 178 and the second corresponding bearing surface 182 define a thrust bearing that prevents the bat mount 132 from translating along the bat 116 in a second axial direction opposite the one axial direction.

These two thrust bearings are defined by the abutting surfaces on the bat mount and the annular rings of the bat 116 are sized to communicate substantial thrust loads on the order of at least 100 pounds-force even as the bat 116 rotates within the bat mount.

In the arrangement illustrated herein, each bat mount 132 defines two thrust bearings, one on each side of the bat mount 132. In an alternative arrangement, each bat mount may define a single thrust bearing capable of communicating thrust from the bat 116 to the bat mount 132 in one direction but not in the other direction.

In this manner, a central tube 118 having a smaller diameter and a thinner wall can be provided that is relatively flexible. And that, but for the thrust bearings arrangement, might sag or droop in the middle by several millimeters. This sagging is at its greatest at the longitudinal midpoint of the central tube 118. In the arrangement described herein, as the central tube begins to sag downwardly under the force of gravity, the bat supports 128 extending downward from the bottom of the central tube 118 will spread apart, reaching their greatest spread at their outermost ends where the bat mounts 132 are located.

Rather than permitting the bat supports 128 to spread apart and permit the central tube 118 to sag, the thrust bearings defined between the bats 116 and the bat mounts 132 exert an inward force on the bat mounts that tends to hold the ends of the bat mounts together. The thrust bearings communicate this force through the bat to adjacent bat mounts 132 by placing the bat 116 in tension.

Since the bat mounts are fixed to the central tube and are provided with sufficient stiffness, this tension in the bat 116 holding adjacent bat mounts in their normal positions significantly reduces any sagging by the central tube 118.

In a similar fashion, when a bat 116 rotates to the top of the central tube the central tube 118, by sagging, will tend to fan the bat supports 128 inwardly, and toward each other at their outermost (uppermost) ends where the bat mounts 132 are located. The thrust bearings defined by the bat 116 and the bat mounts 132 that are located above the central tube will resist this sagging by placing the bats 116 under compression. The bats 116, through the thrust bearings, will push outward on the bat mounts 132 thereby tending to reduce the sagging of the central tube 118.

The thrust bearing arrangement described above permit some of the gravitational load on the reel 108 to be transmitted to the bats 116 via the thrust bearings that are defined between the bat mounts 132 and the bats 116. This in turn, permits the central tube 118 to be made smaller, lighter, and hence more flexible.

For any given length of a reel 108 the wall thickness of the central tube 118 can be reduced. Furthermore, the overall diameter of the central tube 118 can also be reduced. Reducing the wall thickness of the central tube 118 and the diameter of the central tube 118 permits the agricultural harvesting head 104 to be reduced in weight.

To do this, the thrust loads countered by the thrust bearings must be sufficient to lift the central tube 118 and prevent it from drooping or sagging under the weight of gravity.

The specific arrangement of the thrust bearings may vary from that which is shown therein. One can best understand what a thrust bearing is in the context of this application by understanding the thrust loads which it is capable of exerting and surviving unbroken, as well as the reduction in strength or size of the central tube which can be provided by use of the thrust bearing.

One-Time Maximum Load of the Thrust Bearings

The thrust bearings formed by the bat mounts 132 and the bats 116 are sized sufficient to resist a one-time tensile axial load of at least 200 lbf in the bat 116 applied to the bat mount 132 without breaking the bat 116 or the bat mount 132.

In another arrangement, the thrust bearings formed by the bat mounts 132 in the bats 116 are sized sufficient to resist a one-time tensile axial load of at least 400 lbf in the bat 116 applied to the bat mount 132 without breaking the bat 116 or the bat mount 132.

In another arrangement, the thrust bearings formed by the bat mounts 132 and the bats 116 are sized sufficient to resist a one-time tensile axial load of at least 800 lbf in the bat 116 applied to the bat mount 132 without breaking the bat 116 or the bat mount 132.

Cyclical Loading of the Thrust Bearings

The thrust bearings are also sized sufficient to permit continuous operation of the reel for 360,000 reel rotations (a typical year's operation) of the agricultural harvester with a cyclical load in which each reel rotation constitutes cycling the thrust bearing over an axial tensile load that starts at zero, then increases to 100 lbf in tension, then drops to zero, then increases to −100 lbf (i.e. compression), then returns to zero lbf (which is defined as one full cycle at 100 lbf) without breaking the bat 116 or the bat mount 132.

In another arrangement, the thrust bearings are sized sufficient to permit the same continuous operation cycling from 0 lbf to 200 lbf to 0 lbf to −200 lbf to 0 lbf without breaking the bat 116 or the bat mount 132.

In another arrangement, the thrust bearings are sized sufficient to permit the same continuous operation, cycling instead from 0 lbf to 400 lbf to 0 lbf to −400 lbf to 0 lbf without breaking the bat 116 or the bat mount 132.

Central Tube Length to Central Tube Outer Diameter Ratio

By providing the thrust bearing arrangement described herein in which the gravitational load that would normally deflect the central tube is transferred to the bats, bat mounts and bat supports, the ratio of the central tube length divided by the central tube outer diameter (i.e. the central-tube-length-to-central-tube-diameter) can be reduced significantly.

Prior art central-tube-length-to-central-tube-diameter ratios vary from 30-40 for reels that are 20 feet long. Prior art central-tube-length-to-central-tube-diameter ratios vary from 35-45 for reels that are 30 feet long and 42-53 for reels that are 35 feet long.

By providing the thrust bearing arrangement described herein, central-tube-length-to-central-tube-diameter ratio can be at least 45, alternatively at least 55. Alternatively they can be at least 65 for reels in the range of 20-25 feet long.

By providing the thrust bearing arrangement described herein, central-tube-length-to-central-tube-diameter ratio can be at least 50, alternatively at least 60, and alternatively at least 70 for reels in the range of 25-30 feet long.

By providing the thrust bearing arrangement described herein, central-tube-length-to-central-tube-diameter ratios can be at least 55 for reels in the range of 30-35 feet long. Alternatively they can be at least 65 for reels in the range of 30-35 feet long. Alternatively they can be at least 75 for reels in the range of 30-35 feet long.

By providing the thrust bearing arrangement described herein, central-tube-length-to-central-tube-diameter ratios can be at least 60 for reels with a length greater than 35 feet.

By providing the thrust bearing arrangement described herein, central-tube-length-to-central-tube-diameter ratios can be at least 72 for reels with a length greater than 35 feet.

By providing the thrust bearing arrangement described herein, central-tube-length-to-central-tube-diameter ratios can be at least 85 for reels with a length greater than 35 feet.

Central Tube Outer Diameter to Wall Thickness Ratio

Since the thrust bearing arrangement described herein permits the use of a central tube having a smaller outer diameter relative to the length of the reel, additional strength can be provided for the reel by increasing the wall thickness of the central tube relative to the outer diameter of the central tube while still decreasing the total weight of the central tube 118 as compared to the prior art.

Prior art central-tube-outer-diameter-to-wall-thickness ratios are typically 80-95 for reels with an overall length in the range of 20-25 feet.

Prior art central-tube-outer-diameter-to-wall-thickness ratios range between 100-125 four reels with an overall length in the range of 30-35 feet.

By providing the thrust bearing arrangement described herein, the central-tube-outer-diameter-to-wall-thickness ratio can be reduced to no greater than 75 four reels in the range of 20-25 feet long.

By providing the thrust bearing arrangement described herein, the central-tube-outer-diameter-to-wall-thickness ratio can be reduced to no greater than 68 for reels in the range of 20-25 feet long.

By providing the thrust bearing arrangement described herein, the central-tube-outer-diameter-to-wall-thickness ratio can be reduced to no greater than 63 for reels in the range of 20-25 feet long.

Significant improvements can also be provided for reels of even greater length.

By providing the thrust bearing arrangement described herein, the central-tube-outer-diameter-to-wall-thickness-ratio can be reduced to no greater than 80 for reels with a length in the range of 25-50 feet long.

By providing the thrust bearing arrangement described herein, the central-tube-outer-diameter-to-wall-thickness-ratio can be reduced to no greater than 72 for reels with a length in the range of 25-50 feet long.

By providing the thrust bearing arrangement described herein, the central-tube-outer-diameter-to-wall-thickness-ratio can be reduced to no greater than 65 for reels with a length in the range of 25-50 feet long.

Central Tube Outer Diameter to the Major Diameter of the Reel Ratio

In the traditional reel arrangement, in which the reel has no thrust bearings, any increase in the diameter of the reel requires longer bat supports. This increases the weight of the reel. Consequently, the diameter of the central tube must be increased and the wall thickness increased to maintain the same rigidity of the reel. Both the greater length of the bat supports and the larger diameter and wall thickness of the reel result in a significantly increased weight to the reel.

In the present thrust bearing arrangement, increasing the length of the bat supports does not require a larger reel. In fact, increased length of the bat supports provide substantially more rigidity, since the rigidity provided by the thrust bearing arrangement is a function not only of the tension in the bats, but also of the length of the reels. The greater the length of the bat supports, the greater the rigidity provided by the thrust bearing arrangement (for any given tension in the bats). While the increased length of the bat supports will increase the overall weight of the reel, the thrust bearing arrangement more than compensates this increased weight by the increased rigidity provided due to the greater length of the bat supports. Thus the central tube does not have to be increased in diameter or wall thickness even when longer bat supports are provided as long as the thrust bearing arrangement described herein is provided to help support the reel and increases rigidity.

This increased bat support length relative to the outer diameter of the central tube 118 can be expressed as a ratio of the outer diameter of the central tube 118 to the major diameter of the reel (central-tube-outer-diameter-to-major-diameter-of-the-reel). The term "major diameter" means the diameter of an imaginary circle that is small enough to just circumscribe the bats, wherein the imaginary circle is defined in a plane that is perpendicular to the rotational axis 120.

In prior art arrangements, and for reels of 20-25 feet in length, the ratio of the central tube outer diameter (in millimeters) to the major diameter of the reel (in inches) was not less than 2.8. In prior art arrangements, and for reels of 30-35 feet in length, the ratio of the central-tube-outer-diameter-to-major-diameter-of-the-reel was no less than 4.9.

In the present thrust bearing arrangement, and for reels of 20 feet or greater in length, the central-tube-outer-diameter-to-major-diameter-of-the-reel ratio is no greater than 2.7.

In an alternative thrust bearing arrangement, and for reels of 20 feet or greater in length, the central-tube-outer-diameter-to-major-diameter-of-the-reel ratio is no greater than 2.5.

In an alternative thrust bearing arrangement, and for reels of 20 feet or greater in length, the central-tube-outer-diameter-to-major-diameter-of-the-reel ratio is no greater than 2.0.

In an alternative thrust bearing arrangement, and for reels of 30 feet or greater in length, the central-tube-outer-diameter-to-major-diameter-of-the-reel ratio is no greater than 4.0.

In an alternative thrust bearing arrangement, and for reels of 30 feet or greater in length, the central-tube-outer-diameter-to-major-diameter-of-the-reel ratio is no greater than 3.5.

In an alternative thrust bearing arrangement, and for reels of 30 feet or greater in length, the central-tube-outer-diameter-to-major-diameter-of-the-reel ratio is no greater than 3.0.

The description above includes examples of several different ways in which the invention may be made.

There are other ways to make the invention as well.

For example, the first and second annular rings may be collars that are permanently fixed or removably fixed to the bat. The annular rings may be formed integral with the bat. The annular rings may extend into instead of out of the surface of the bar. The annular rings may be held in their longitudinal position on the bat by a key or other fixation means such as a bolt or screw. The bearing surfaces may be conical or curved. The annular rings may be fashioned in separate pieces that are assembled around the bat. The annular rings may be formed as part of a common member or members that are positioned on the bat and fixed in place. The bat supports can be made rigid and the struts dispensed with entirely. There may be more or less than six bats distributed around the central tube. Each bat and bat mount need not be configured as a thrust bearing. There may be as few as three sets (126) of bat supports including one set (126) at each end of the reel and one set (126) disposed intermediate the two end sets (126) as long as there is at least one set (126) of bat supports located intermediate the two end sets (126) of bat supports and that that at least one intermediate set is configured to have thrust bearings as described above. Some of the sets (126) of bat supports need not be configured to have thrust bearings. There may be three, four, five, six, eight, nine or more sets (126) of bat supports. Other alterations and configurations of the reel may be provided that are consistent with the claims recited below. The full scope of the invention is recited in the claims below and is not limited by the specific embodiments disclosed herein.

We claim:

1. A reel (108) for an agricultural harvesting head (104), the reel comprising:

a central tube (118) that is elongate, that has a circumference, and that has a rotational axis (120);

a plurality of sets (126) of elongate axially spaced bat supports (128) mounted to the central tube (118) and extending outward from the central tube, wherein the plurality of sets (126) of bat supports (128) are spaced longitudinally along the length of central tube (118);

wherein each bat support (128) has an inner end fixed to the circumference of the central tube (118);

a plurality of bats (116) that are elongate and extend parallel to the central tube (118), wherein the bats (116) are spaced apart about the circumference and further wherein each of the bats (116) is configured to support a plurality of spaced-apart fingers (122) that are configured to engage the tops of crop plants and move them toward the agricultural harvesting head (104), wherein each bat (116) comprises a single continuous tube continuously extending across at least two of the axially spaced sets (126) of bat supports (128);

a plurality of bat mounts (132) fixed to outer ends of the bat supports (128), wherein each of the bat supports is U-shaped and has a web (156) that is generally planar and extends radially in a plane perpendicular to the rotational axis (120), with the web (156), as considered in a forward direction of rotation of the reel (108), having leading and trailing edges respectively to which are joined leading and trailing flanges (158) and (160);

wherein each of the bat mounts (132) includes first and second hinge portions (162, 162) each having a hinge coupling (166) at one end joined to a mounting portion (174) by a connecting strap portion (168), with the hinge couplings of the hinge portion being connected together by a hinge pin (164), with the strap portions (168) each having a semi-cylindrical recess (170), with the respective recesses forming a cylindrical aperture in which a corresponding cylindrical surface of an associated bat (116) is supported when the hinge portions (162, 162) are hinged together in a closed position;

wherein the mounting portions (174, 174) respectively of the hinge portions (162, 162) of each of the bat mounts (132) have complementary confronting surfaces engaged with each other when the hinge portions are in the closed position with the mounting portions (174, 174) located between the flanges (158) and (160) of a radially outer end portion of an associated one of the bat supports (128), and fasteners (144) extending through aligned sets of holes provided in the flanges (158 and 160) and in the associated mounting portions (174, 174) and clamping the confronting surfaces of the mounting portions against each other, wherein the connecting strap portions (168) of each hinge portion (162) of each bat mount (132) of the plurality of bat mounts (132) have parallel, opposite first and second side bearing surfaces (176) and (178) disposed substantially perpendicular to a rotational axis (124) of an associated one of the bats (116); and said associated one of the bats (116) having parallel third and fourth bearing surfaces (180) and (182) respectively located in adjacent facing relationship to said first and second side bearing surfaces, whereby the first side bearing surface (176) and the third bearing surface (180) and the second side bearing surface (178) and fourth bearing surface (182) are facing surfaces and are disposed to abut each other to form first and second thrust bearings.

2. The reel of claim 1, wherein a radial height of the first and second side bearing surfaces (176) and (178) from the cylindrical surface of the associated bat (116) is substantially equal to the radial height of the third and fourth bearing surfaces (180) and (182) from the cylindrical surface of the associated bat (116).

3. The reel of claim 2, wherein the third bearing surface (180) is formed on an annular ring (184) that is fixed to, surrounds, and extends radially outward from the cylindrical surface of said associated bat (116), and wherein the fourth bearing surface (182) is formed on an annular ring (186) that is fixed to, surrounds, and extends radially outward from the outer surface of said associated bat (116).

4. The reel of claim 1 and further including a strut (142) associated with each bat support (128) of at least some of the sets (126) of bat supports (128), wherein the strut (142) has a first end connected to the web (156) of an associated bat support (128) and having a second end fixed to the central tube of the reel at a location spaced axially from the inner end of the associated bat support.

5. The reel of claim 4 wherein the strut (142) is constructed from a plate that is disposed in a plane extending radially relative to the rotation axis (120) of the reel, with the first end of the strut (142) being centered between the flanges (158) and (160); a strut support (148) being fixed to said central tube at said location spaced axially from the inner end of the associated bat support, with the strut support (148) defining a strut support flange (150) that is disposed parallel to the rotation axis (120) and extends radially relative to the rotation axis; and said second end of the strut being secured to said strut support flange (150).

6. The reel of claim 1 further comprising struts (142), each strut (142) angularly extending between the central tube (118) and one of the bat supports (128), each strut having a first end affixed to the central tube (118) and a second end affixed to said one of the bat supports (128).

* * * * *